(12) United States Patent
Grimm et al.

(10) Patent No.: US 10,829,308 B2
(45) Date of Patent: Nov. 10, 2020

(54) RADIAL CONVEYOR UNDERCARRIAGE APPARATUS, SYSTEMS AND METHODS

(71) Applicant: Superior Industries, Inc., Morris, MN (US)

(72) Inventors: Lafe Grimm, Hancock, MN (US); Tyler Hein, Fargo, ND (US)

(73) Assignee: Superior Industries, Inc., Morris, MN (US)

( * ) Notice: Subject to any disclaimer, the term of this patent is extended or adjusted under 35 U.S.C. 154(b) by 0 days.

(21) Appl. No.: 16/467,429

(22) PCT Filed: Dec. 1, 2017

(86) PCT No.: PCT/US2017/064224
§ 371 (c)(1),
(2) Date: Jun. 6, 2019

(87) PCT Pub. No.: WO2018/106533
PCT Pub. Date: Jun. 14, 2018

(65) Prior Publication Data
US 2020/0122929 A1    Apr. 23, 2020

Related U.S. Application Data

(60) Provisional application No. 62/430,995, filed on Dec. 7, 2016.

(51) Int. Cl.
*B65G 21/12*    (2006.01)
*B65G 21/14*    (2006.01)
*B65G 41/00*    (2006.01)

(52) U.S. Cl.
CPC ............. *B65G 21/12* (2013.01); *B65G 21/14* (2013.01); *B65G 41/008* (2013.01); *B65G 2812/02029* (2013.01)

(58) Field of Classification Search
CPC ...... B65G 21/12; B65G 21/14; B65G 41/002; B65G 41/005; B65G 41/008; B65G 41/02
USPC .................................................. 198/300, 306
See application file for complete search history.

(56) References Cited

U.S. PATENT DOCUMENTS

| | | | |
|---|---|---|---|
| 4,135,614 A | 1/1979 | Penterman et al. | |
| 4,427,104 A | 1/1984 | Reid, Jr. | |
| 4,726,459 A * | 2/1988 | Vos ...................... | B65G 41/008 180/65.51 |
| 5,515,961 A * | 5/1996 | Murphy ............... | B65G 41/008 198/302 |
| 5,833,043 A * | 11/1998 | Schmidgall .......... | B65G 41/008 198/302 |
| 6,056,252 A * | 5/2000 | Johannsen ............. | B65G 21/14 198/812 |
| 6,186,311 B1 * | 2/2001 | Conner .................. | B65G 21/14 198/300 |

(Continued)

OTHER PUBLICATIONS

International Search Report and Written Opinion, PCT Application No. PCT/US2017/064224, dated Feb. 1, 2018, 21 pages.

*Primary Examiner* — James R Bidwell
(74) *Attorney, Agent, or Firm* — Todd R. Fronek; Larkin Hoffman Daly & Lindgren Ltd.

(57) ABSTRACT

Radial conveyors and undercarriages therefor are disclosed. Some embodiments include a wheel assembly with transport and operational configurations. In some embodiments, a wheel of the wheel assembly is selectively aligned with a tail pivot of the radial conveyor.

19 Claims, 15 Drawing Sheets

(56) References Cited

U.S. PATENT DOCUMENTS

| | | | |
|---|---|---|---|
| 6,360,876 B1 | 3/2002 | Nohl et al. | |
| 6,929,113 B1 | 8/2005 | Hoover et al. | |
| 7,470,101 B2 | 12/2008 | Felton | |
| 8,584,826 B2 * | 11/2013 | Smith | B65G 41/008 198/302 |
| 8,739,956 B2 * | 6/2014 | Smith | B65G 41/008 180/6.48 |
| 2007/0101897 A1 | 5/2007 | Stevick et al. | |
| 2011/0139576 A1 | 6/2011 | Johannsen | |
| 2011/0226583 A1 | 9/2011 | Johannsen | |
| 2013/0092506 A1 | 4/2013 | Smith | |
| 2018/0265302 A1 * | 9/2018 | McCloskey | B65G 41/008 |

* cited by examiner

RADIAL CONVEYOR UNDERCARRIAGE APPARATUS, SYSTEMS AND METHODS

BACKGROUND

Radial conveyors are used to convey materials (e.g., aggregate materials) onto a stockpile or other destination. Some radial conveyors include undercarriages for rollingly supporting the conveyor.

DESCRIPTION

Radial conveyor embodiments and undercarriage embodiments therefor are disclosed herein. Some embodiments include wheel support assemblies having operational and transport configurations.

Figure 1:
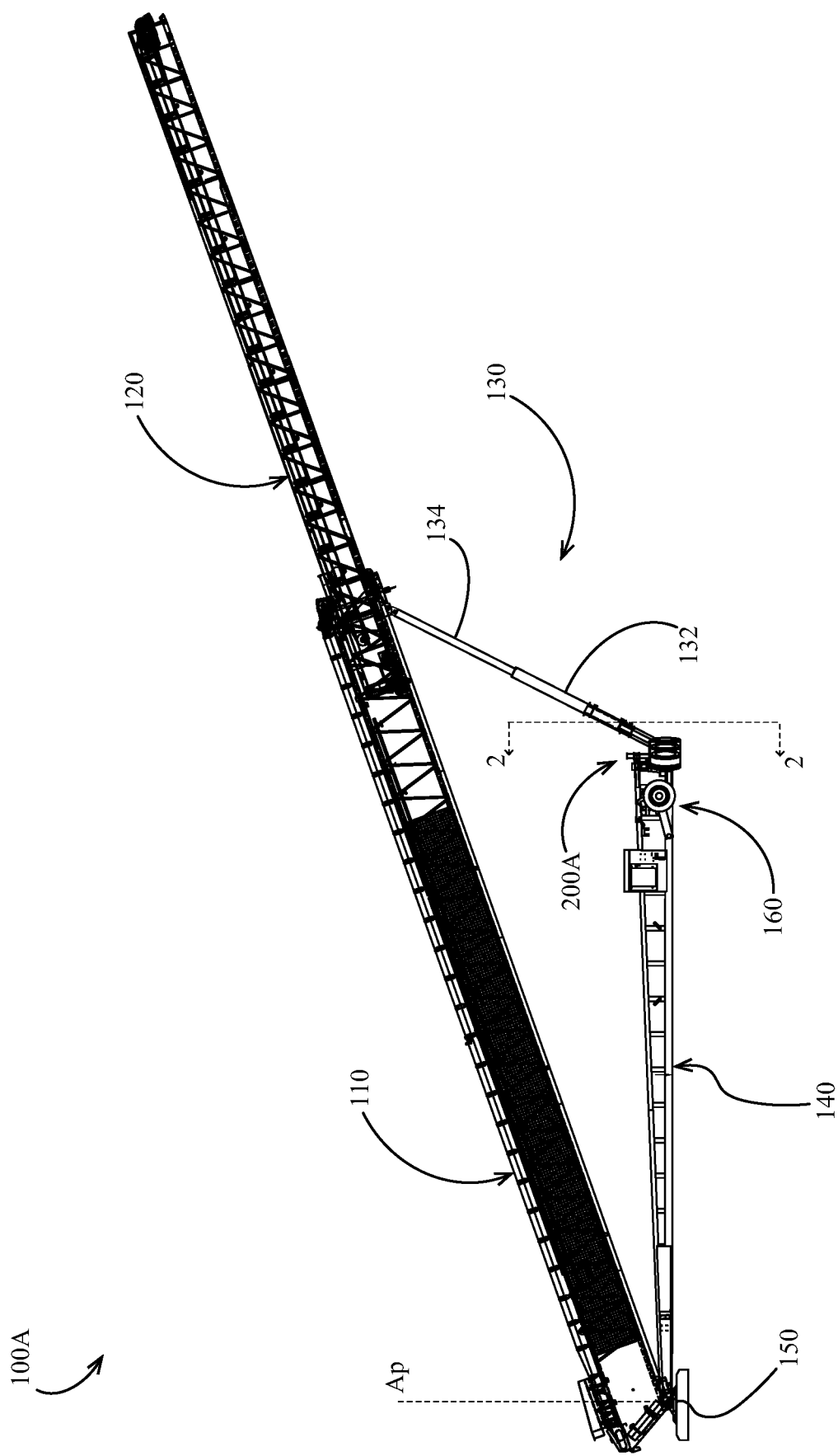
FIG. 1 is a side elevation view of an embodiment of a radial conveyor in an operational configuration.
Figure 5:
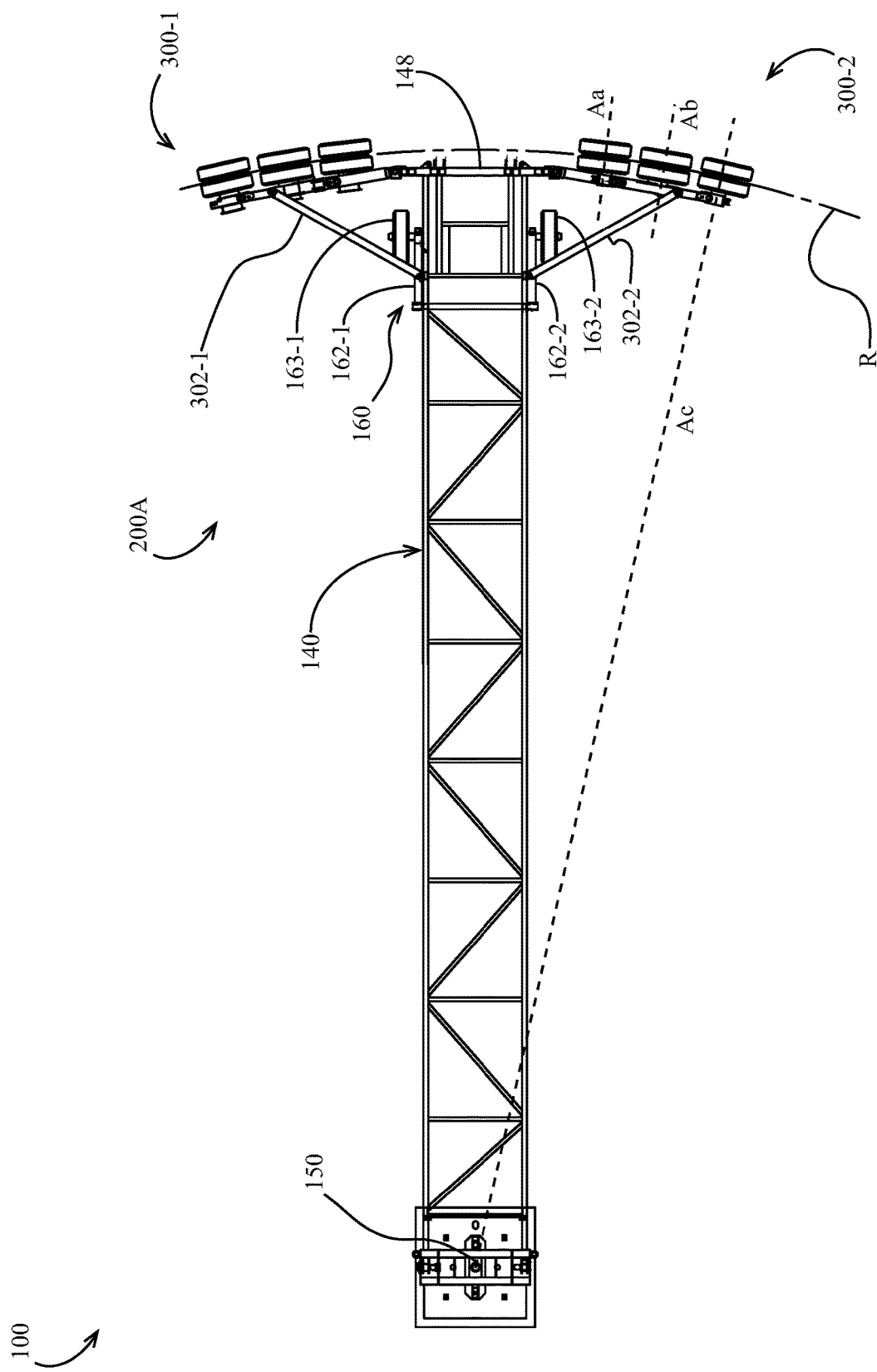
FIG. 5 is a plan view of an embodiment of an undercarriage of the radial conveyor of FIG. 1 in an operational configuration.

Referring to the drawings, wherein like reference numerals designate identical or corresponding parts throughout the several views, FIG. 1 illustrates an embodiment of a radial conveyor 100 in an operational configuration (denoted as 100A). The conveyor 100 optionally includes a first conveyor section 110 optionally including a truss operably supporting a conveyor belt. The conveyor 100 optionally includes an extendable second conveyor section 120 for extending the length of conveyor. The conveyor section 110 (and/or conveyor section 120) is optionally rollingly supported by an undercarriage 200 also shown in an operational configuration in FIG. 1 (denoted as 200A). The conveyor section 110 is optionally pivotally supported (e.g., generally at a feed end thereof) by a tail pivot 150 for pivoting the conveyor 100 about a pivot axis Ap (e.g., a generally vertical axis). The undercarriage 200 is optionally coupled (e.g., rigidly coupled) to the tail pivot 150 (and/or the conveyor section 110) by an undercarriage frame 140 (e.g., a rigid frame). Referring to FIG. 5, the undercarriage 200 optionally moves along a path (e.g., a radial and/or semicircular path) R such as during operation (e.g., stacking operation). The path R optionally has its center at or near the tail pivot 150, e.g., at the pivot axis Ap.

Continuing to refer to FIG. 1, the undercarriage 200 is optionally coupled to the conveyor section 110 (and/or conveyor section 120) by a strut 130. The strut 130 is optionally pivotally coupled at a lower end thereof to the undercarriage 200 and pivotally coupled at an upper end thereof to the conveyor section 110 (and/or conveyor section 120). The strut 130 optionally comprises a telescoping strut having a lower strut section 132 which slidingly engages an upper strut section 134; in other embodiments, the strut 130 comprises a fixed-length strut.

Figure 2:
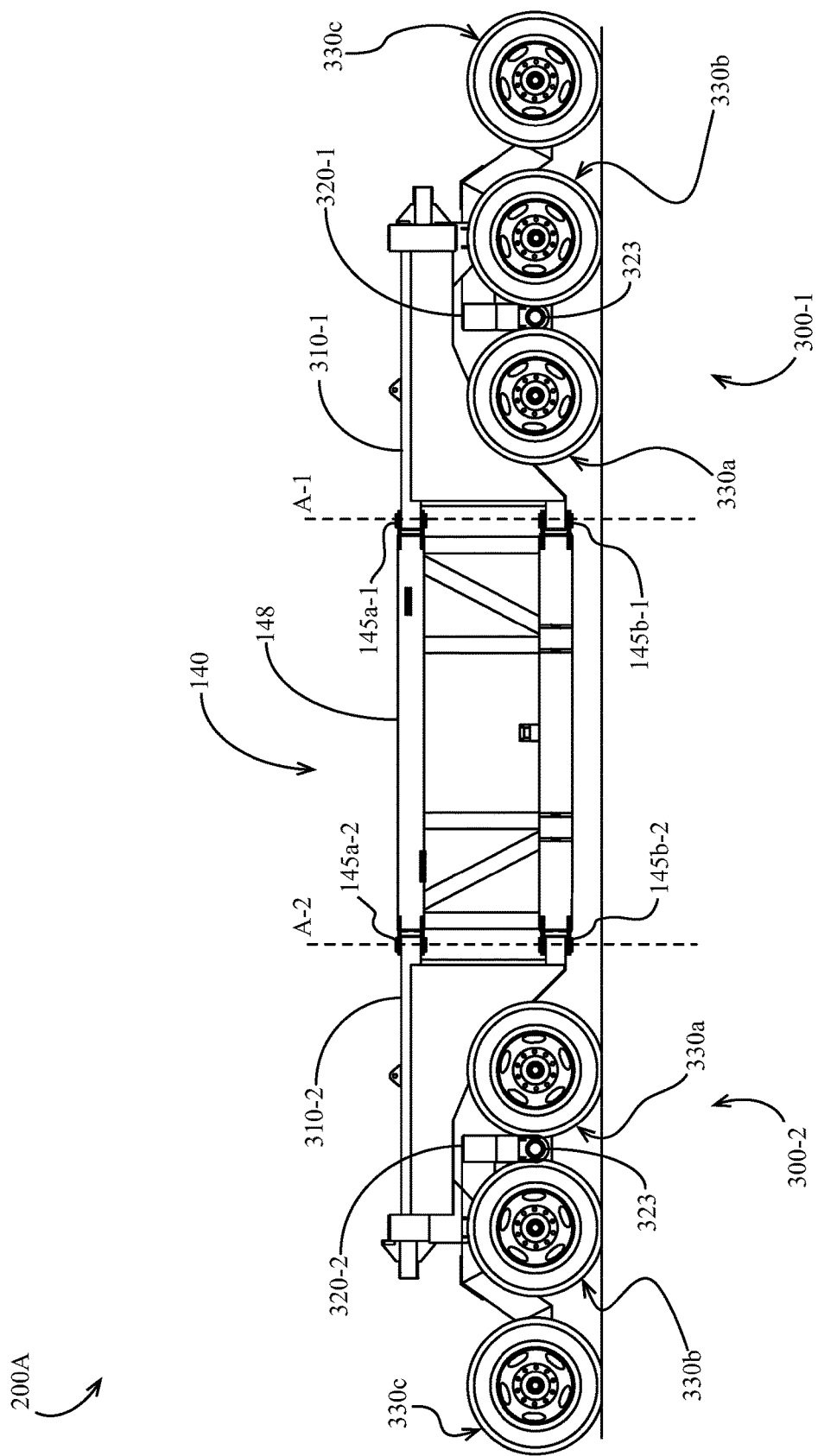
FIG. 2 is a view of an embodiment of an undercarriage of the radial conveyor of FIG. 1 along the section 2-2 of FIG. 1.

Referring to FIG. 2, the undercarriage 200 is shown in more detail. The undercarriage 200 optionally includes left and right wheel support assemblies 300-1, 300-2, respectively. The wheel support assemblies 300-1, 300-2 are optionally disposed on opposing sides of the frame 140. Each wheel support assembly 300 is optionally pivotally coupled to the frame 140. In some embodiments, each wheel support assembly 300 is pivotally coupled to the frame 140 by a pivot connection. The pivot connection may comprise upper and lower pivots 145a, 145b of the frame 140 and upper and lower pivots 305a, 305b (see FIG. 3), respectively, may be pivotally joined by pins or other structure. The pivot connection is optionally disposed on a frame 148 of the frame 140. The wheel support assemblies 300-1, 300-2 optionally pivot about axes A-1, A-2, respectively (e.g., vertical axes) relative to the frame 140. Each wheel support assembly 300 optionally has a transport configuration (see FIG. 8) in which the wheel support assembly is generally aligned with (and/or positioned alongside) the frame 140. The transport configuration of the undercarriage 200 is denoted 200B. Each wheel support assembly 300 optionally has an operational configuration in which the wheels of the wheel support assembly are generally aligned with (and/or disposed to travel along) the path R (as shown in FIG. 2 and FIG. 5).

Figure 8:
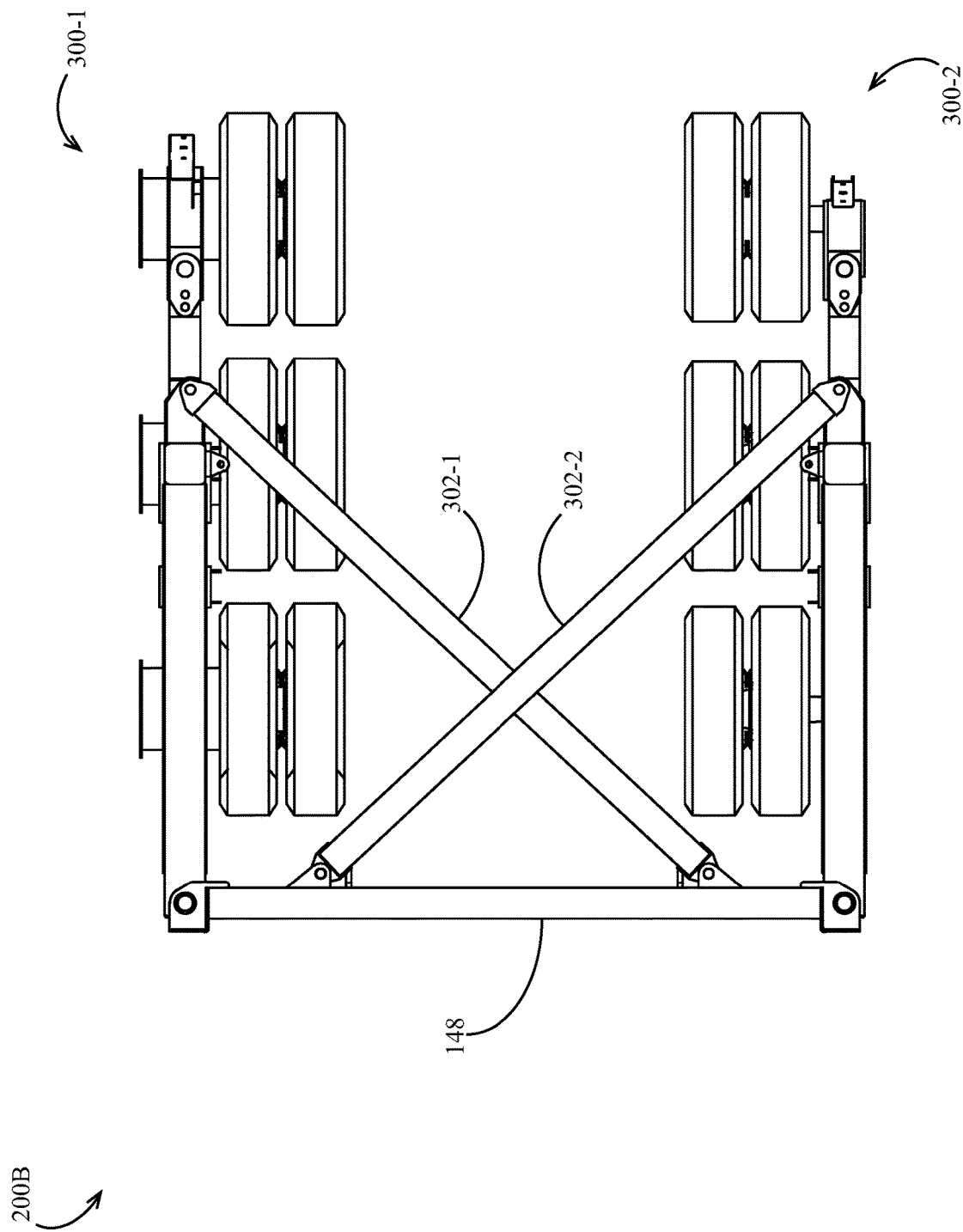
FIG. 8 is a side elevation view of an embodiment of an undercarriage of the radial conveyor of FIG. 1 in a transport configuration along the section 8-8 of FIG. 7.

Each wheel support assembly 300 optionally comprises a pivot arm 310. The pivot arm 310 optionally pivots about the associated axis A between the transport and operational configurations. As shown in FIG. 5, in the operational configuration a locking arm 302 optionally selectively retains each wheel support assembly 300 in the operational configuration. As shown in FIG. 8, in the transport configuration a locking arm 302 optionally selectively retains each wheel support assembly in the transport configuration. Each locking arm 302 is optionally pivotally coupled at a first end to the frame 140 and pivotally coupled at a second end to the wheel support assembly 300 (e.g., to the pivot arm 310). In some embodiments, the same locking arm 302 may be selectively coupled to and decoupled from the wheel support assembly 300 and moved (e.g., pivoted) between the transport and operational configurations.

Each wheel support assembly 300 optionally includes a plurality of wheel assemblies 330. In some embodiments, each wheel support assembly 300 includes three wheel assemblies 330a, 330b, 330c. Each wheel assembly 330 optionally includes one or more wheels 332 (e.g., a rear wheel 332r and a forward wheel 332f shown in FIG. 4) rollingly coupled to the remainder of the wheel support assembly 300 by an axle 333. Each axle 333 optionally defines a horizontal rolling axis. Each axle 333 is optionally coupled to one of the first and second rocking members.

Referring to FIGS. 2 through 5, each wheel support assembly 300 optionally comprises a first rocking member 320. The first rocking member 320 is optionally pivotally connected to the pivot arm 310; e.g., at a pivot connection 325. The first rocking member 320 optionally pivots about a horizontal axis relative to the pivot arm 310. The pivot connection 325 is optionally coupled to a medial portion of the first rocking member 320 (e.g., between first and second ends of the first rocking member).

Each wheel support assembly 300 optionally comprises a second rocking member 370. The second rocking member 370 is optionally pivotally connected to the first rocking member 320; e.g., at a pivot connection 323. The second rocking member 370 optionally pivots about a horizontal axis relative to the first rocking member 320. The pivot connection 323 is optionally coupled to an inboard portion 322 of the first rocking member 320. The inboard portion 322 of the first rocking member 320 optionally comprises a vertically extending structure. The pivot connection 323 is optionally coupled to a lower portion of the inboard portion 322.

Figure 3:
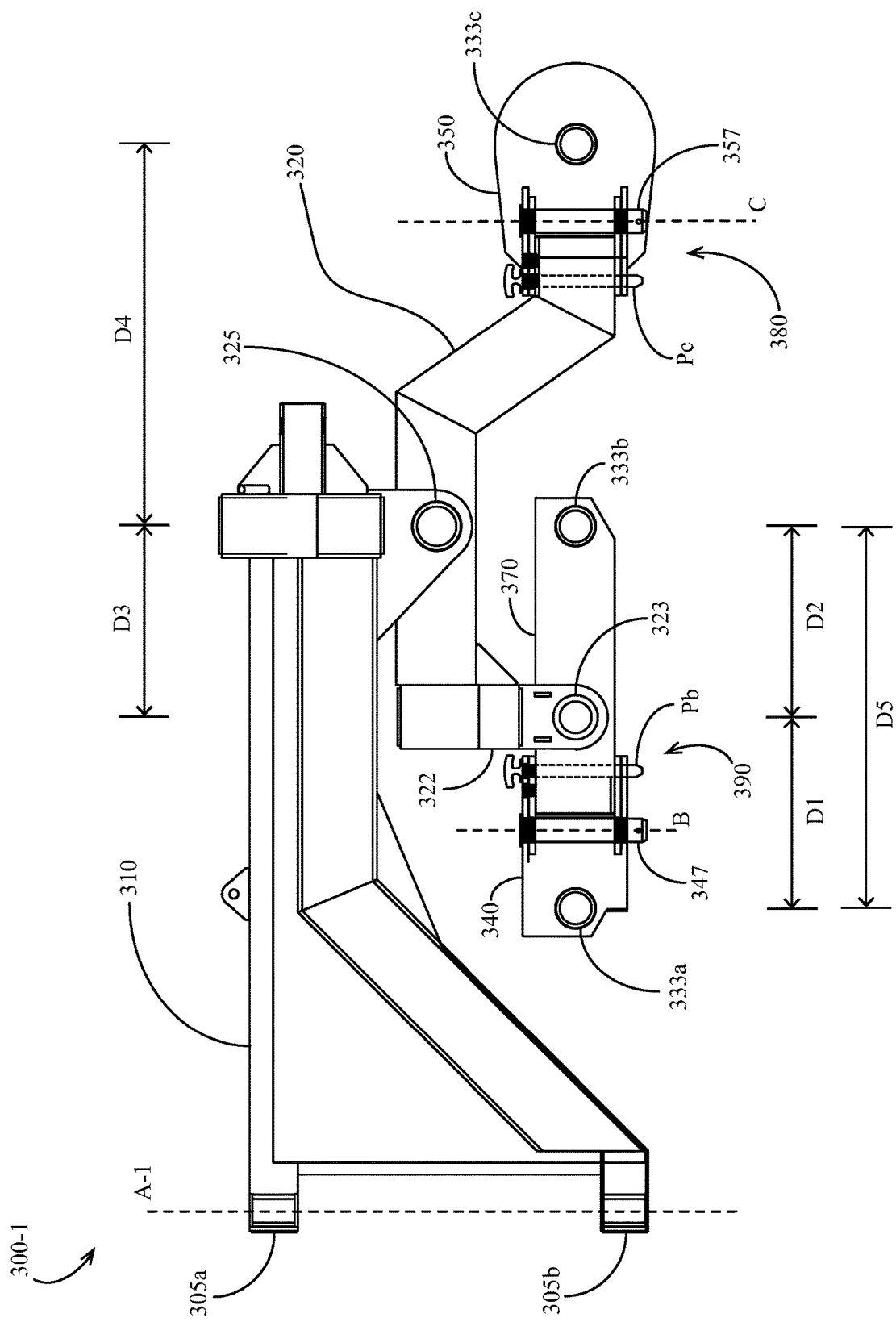
FIG. 3 is a side elevation view of an embodiment of a wheel assembly of the radial conveyor of FIG. 1 with certain components not shown for clarity.
Figure 4:
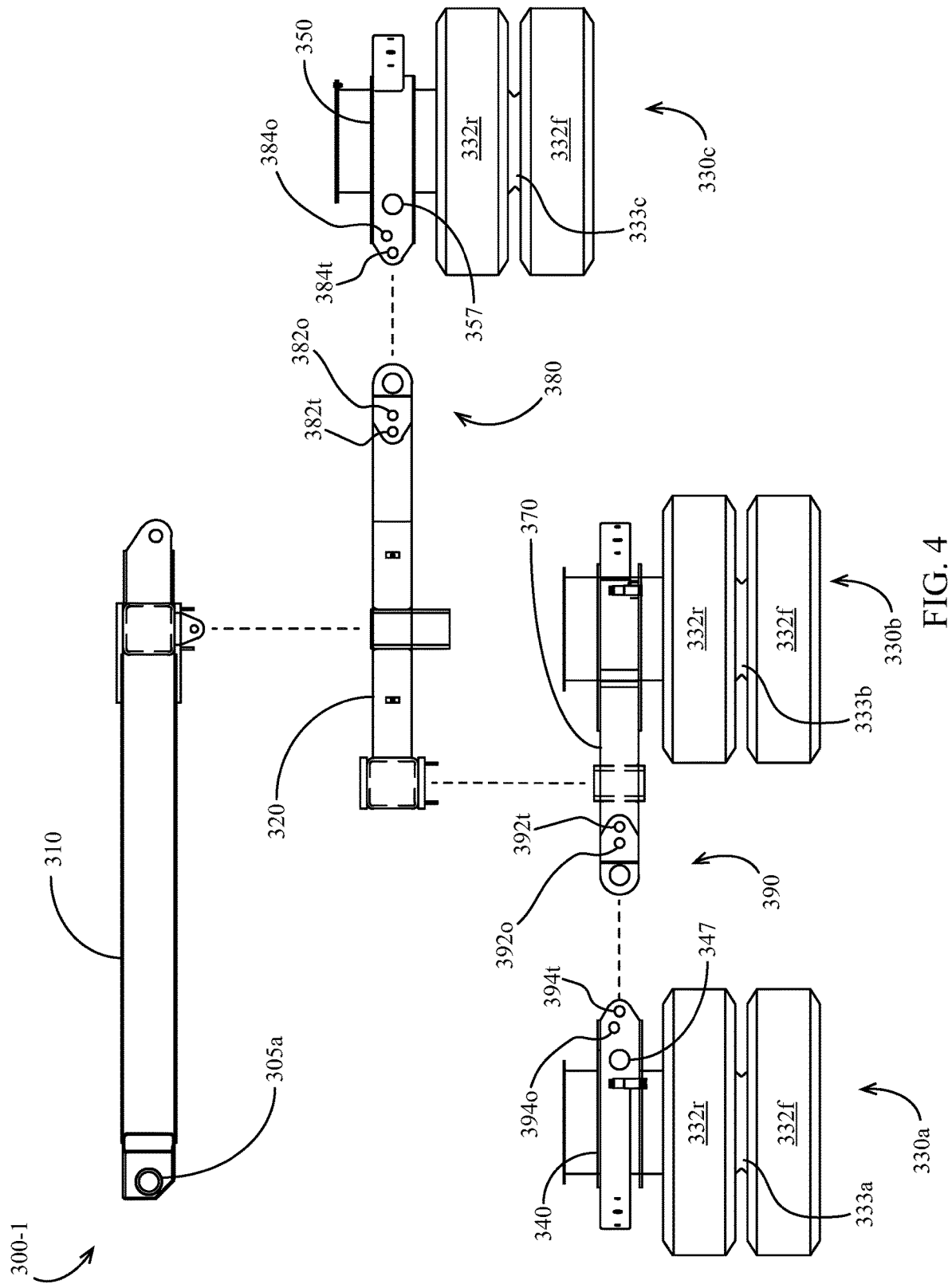
FIG. 4 is an exploded plan view of an embodiment of a wheel assembly of the radial conveyor of FIG. 1.

Referring to FIGS. 3 and 4, the wheel support assembly 300 optionally includes a first pivoting axle support 350. The first pivoting axle support 350 is optionally pivotally coupled to the first rocking member 320; e.g., to an outboard portion of the first rocking member. The first pivoting axle support 350 optionally pivots relative to the remainder of the wheel support assembly 300 (e.g., relative to the first rocking member 320) about a pivot connection 357 (e.g., a pin). The pivot connection 357 optionally defines a vertical axis C. The vertical axis C is optionally disposed outboard of the pivot connection 325. The first pivoting axle support 350 optionally rollingly supports the wheel assembly 330c; for example, in some embodiments the axle 333c is coupled to the first pivoting axle support 350.

Figure 6:
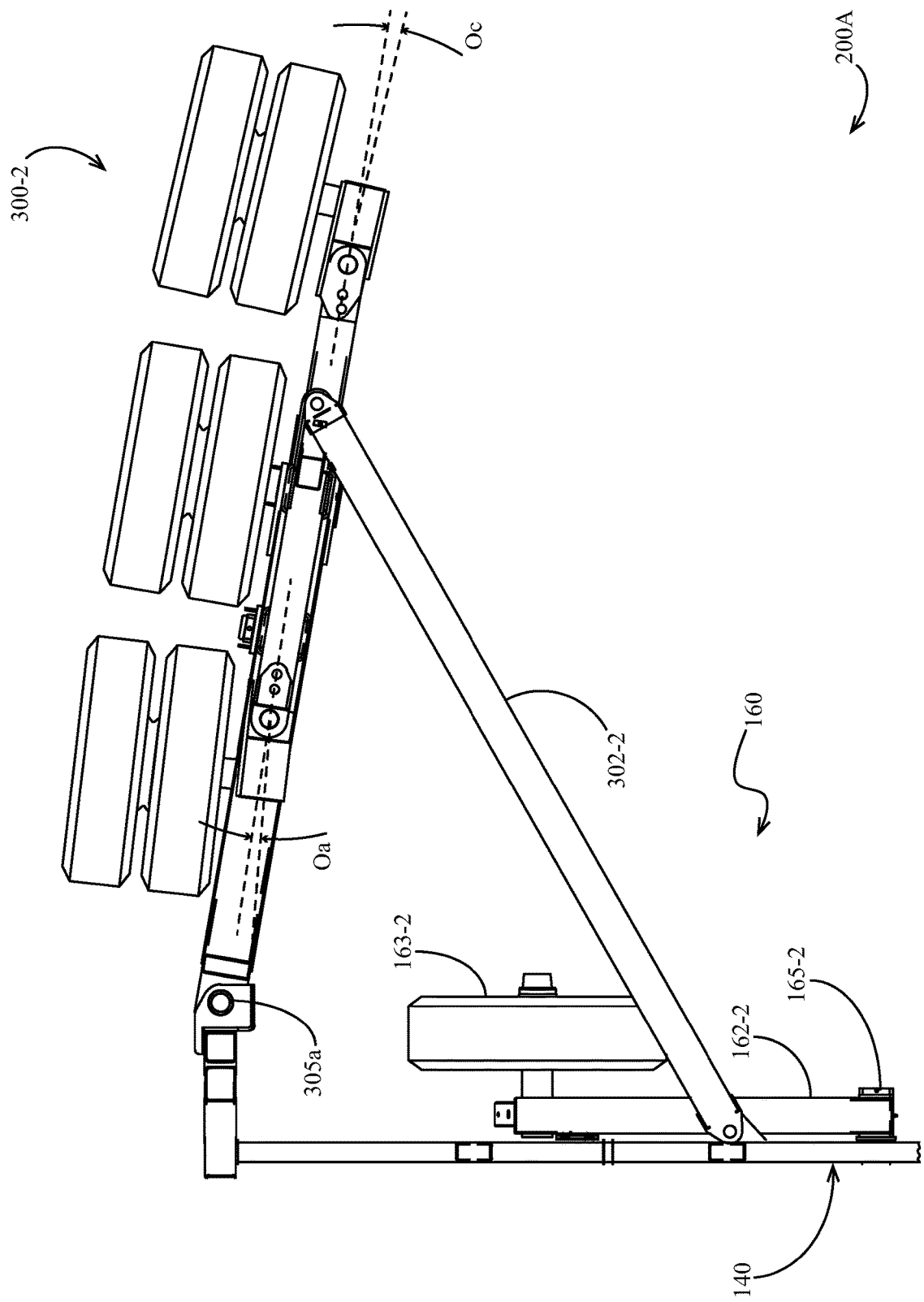
FIG. 6 is a plan view of an embodiment of a wheel assembly of the radial assembly of the radial conveyor of FIG. 1 in an operational configuration.
Figure 7:
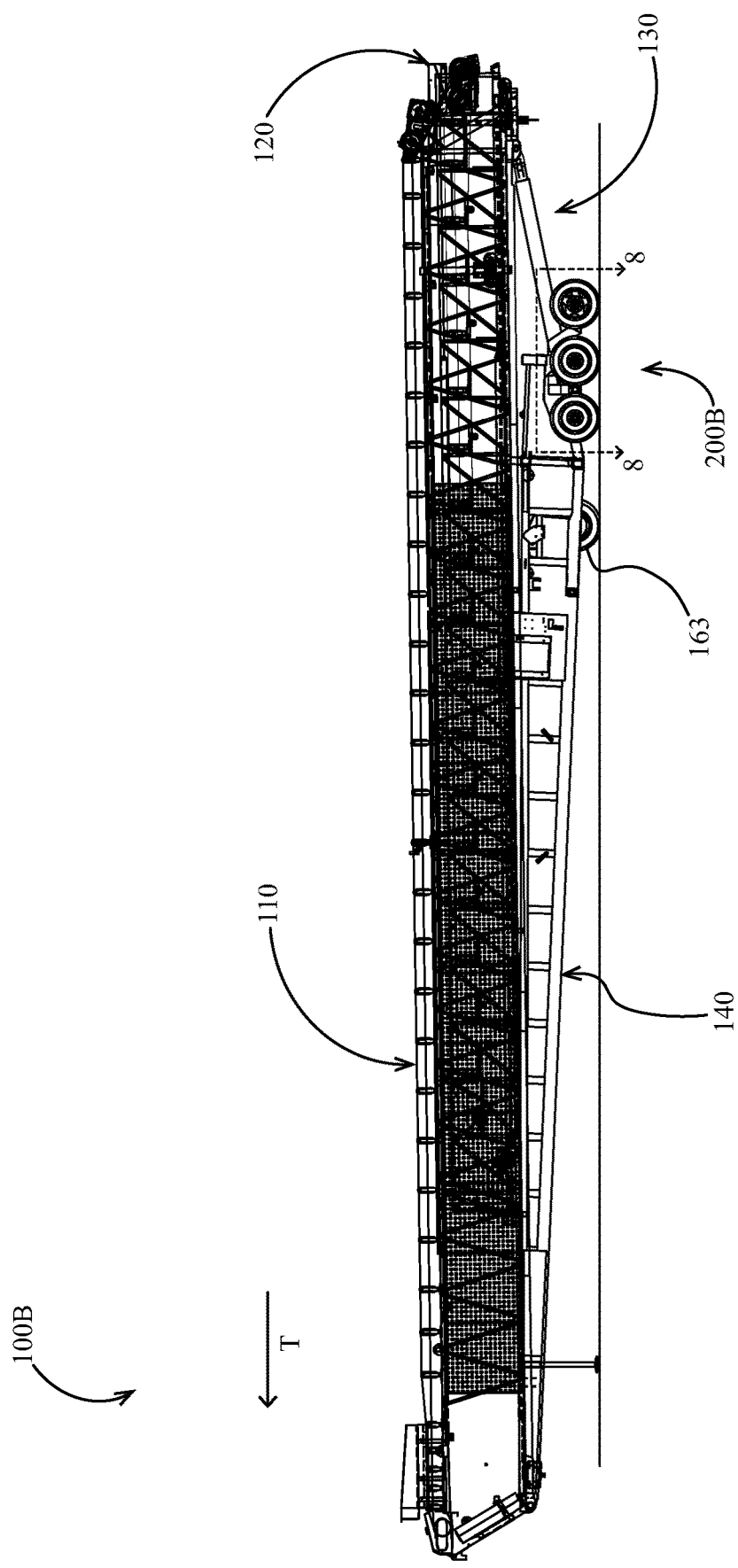
FIG. 7 is a side elevation view of the radial conveyor of FIG. 1 in a transport configuration.

The first pivoting axle support 350 optionally pivots (e.g., about the axis C) between an operational orientation (e.g., the orientation illustrated in FIGS. 5 and 6) and a transport orientation (e.g., the orientation illustrated in FIGS. 7 and 8).

Referring to FIGS. 5 and 6, in the operational orientation of the first pivoting axle support 350, the wheels 332 of the wheel assembly 330c are optionally substantially aligned with the path R. In the operational orientation, an axis Ac defined by the axle 333c is optionally disposed perpendicular to the path R. In the operational orientation, the axle 333c is optionally aligned with the tail pivot 150 (e.g., such that the axis Ac intersects the tail pivot). In the operational orientation, the axis Ac is optionally disposed at an offset angle (e.g., between 0.5 and 5 degrees, about 3 degrees, 3.1 degrees, about 3.1 degrees, between 2.5 and 3.5 degrees, between 2 and 4 degrees) relative to an axis Ab defined by an adjacent axle 333b on the wheel support assembly. In the operational orientation, the first pivoting axle support 350 is optionally disposed at an offset angle Oc (e.g., between 0.5 and 5 degrees, about 3 degrees, 3.1 degrees, about 3.1 degrees, between 2.5 and 3.5 degrees, between 2 and 4 degrees) relative to the first rocking member 320.

Referring to FIGS. 7 and 8, in the transport orientation of the first pivoting axle support 350, the wheels 332 of the wheel assembly 330c are optionally aligned with the transport direction T of the conveyor 100. In the transport orientation, the axis Ac is optionally perpendicular to the transport direction T. In the transport orientation, the axis Ac is optionally parallel to the axis Ab. In the transport orientation, the first pivoting axle support 350 is optionally disposed generally parallel to the first rocking member 320.

Referring to FIGS. 3 and 4, the wheel support assembly 300 optionally includes a locking mechanism 380 for selectively alternately retaining the first pivoting axle support 350 in the transport and operational orientations. The locking mechanism 380 optionally includes corresponding openings 382t, 384t which may be aligned to place the first pivoting axle support in the transport orientation by pivoting the first pivoting axle support 350 about the pivot connection 357. Once aligned, the openings 382t, 384t may be selectively locked together by inserting a locking device such as a pin Pc, which may subsequently be removed to reorient the first pivoting axle support 350. The locking mechanism 380 optionally includes corresponding openings 382o, 384o which may be aligned to place the first pivoting axle support 350 in the operational orientation by pivoting the first pivoting axle support 350 about the pivot connection 357. Once aligned, the openings 382o, 384o may be selectively locked together by inserting a locking device such the pin Pc, which may subsequently be removed to reorient the first pivoting axle support 350. The opening 384o is optionally offset from (e.g., does not intersect) a plane defined by the central axes of the pivot connection 357 and the opening 382t when the first pivoting axle support 350 is in the transport configuration.

Referring to FIGS. 3 and 4, the wheel support assembly 300 optionally includes a second pivoting axle support 340. The second pivoting axle support 340 is optionally pivotally coupled to the second rocking member 370; e.g., to an outboard portion of the second rocking member. The second pivoting axle support 340 optionally pivots relative to the remainder of the wheel support assembly 300 (e.g., relative to the second rocking member 370) about a pivot connection 347 (e.g., a pin). The pivot connection 347 optionally defines a vertical axis B. The vertical axis B is optionally disposed inboard of the pivot connection 325. The second pivoting axle support 340 optionally rollingly supports the wheel assembly 330a; for example, in some embodiments the axle 333a is coupled to the second pivoting axle support 340.

The second pivoting axle support 340 optionally pivots (e.g., about the axis B) between an operational orientation (e.g., the orientation illustrated in FIGS. 5 and 6) and a transport orientation (e.g., the orientation illustrated in FIGS. 7 and 8).

Referring further to FIGS. 5 and 6, in the operational orientation of the second pivoting axle support 340, the wheels 332 of the wheel assembly 330a are optionally substantially aligned with the path R. In the operational orientation, an axis Aa defined by the axle 333a is optionally disposed perpendicular to the path R. In the operational orientation, the axle 333a is optionally aligned with the tail pivot 150 (e.g., such that the axis Aa intersects the tail pivot). In the operational orientation, the axis Aa is optionally disposed at an offset angle (e.g., between 0.5 and 5 degrees, about 3 degrees, 3.1 degrees, about 3.1 degrees, between 2.5 and 3.5 degrees, between 2 and 4 degrees) relative to an axis Ab defined by an adjacent axle 333b on the wheel support assembly. In the operational orientation, the second pivoting axle support 340 is optionally disposed at an offset angle Oa (e.g., between 0.5 and 5 degrees, about 3 degrees, 3.1 degrees, about 3.1 degrees, between 2.5 and 3.5 degrees, between 2 and 4 degrees) relative to the second rocking member 370.

Referring to FIGS. 7 and 8, in the transport orientation of the second pivoting axle support 340, the wheels 332 of the wheel assembly 330a are optionally aligned with the transport direction T of the conveyor 100. In the transport orientation, the axis Aa is optionally perpendicular to the transport direction T. In the transport orientation, the axis Aa is optionally parallel to the axis Ab. In the transport orientation, the second pivoting axle support 340 is optionally disposed generally parallel to the second rocking member 370.

Referring to FIGS. 3 and 4, the wheel support assembly 300 optionally includes a locking mechanism 390 for selectively alternately retaining the second pivoting axle support 340 in the transport and operational orientations. The locking mechanism 390 optionally includes corresponding openings 392t, 394t which may be aligned to place the second pivoting axle support in the transport orientation by pivoting the second pivoting axle support 340 about the pivot connection 347. Once aligned, the openings 392t, 394t may be selectively locked together by inserting a locking device such as a pin Pb, which may subsequently be removed to reorient the second pivoting axle support 340. The locking mechanism 390 optionally includes corresponding openings 392o, 394o which may be aligned to place the second pivoting axle support 340 in the operational orientation by pivoting the second pivoting axle support 340 about the pivot connection 347. Once aligned, the openings 392o, 394o may be selectively locked together by inserting a locking device such the pin Pb, which may subsequently be removed to reorient the second pivoting axle support 340. The opening 394o is optionally offset from (e.g., does not intersect) a plane defined by the central axes of the pivot connection 347 and the opening 392t when the second pivoting axle support 340 is in the transport configuration.

Each wheel support assembly 300 optionally includes a wheel assembly 330b. An axle 333b of the wheel assembly 330b is optionally coupled to the second rocking member 370 (e.g., coupled to an outboard end thereof). In some embodiments, the axle 333b is vertically aligned with the pivot connection 325 when the second rocking member 370 is in a horizontal orientation. In the transport configuration of the wheel support assembly 300, the wheel assembly 330b is optionally aligned with (e.g., disposed to travel along) the path R. The axis Ab defined by the axle 333b is optionally aligned with the tail pivot 150 (e.g., by selective orientation of the pivot arm 310 and/or by sizing of the associated locking arm 302).

Referring to FIG. 3, several horizontal distances D1, D2, D3, D4, D5 are illustrated between various axles and pivot connections of the wheel support assembly 300. It should be appreciated that each illustrated distance is measured between the centers of each axle and/or pivot. The distance D1 between the axle 333a and the pivot connection 323 is optionally equal to (or approximately equal to) the distance D2 between the pivot connection 323 and the axle 333b. The total distance D5 between the axle 333a and the axle 333b is optionally equal to the sum of the distances D1 and D2. The distance D3 between the pivot connection 325 and the pivot connection 323 is optionally equal to (or approximately equal to) the distance D2. The distance D3 is optionally half of the distance D4 between the pivot connection 325 and the axle 333c. The distance D4 is optionally equal to the distance D5.

Referring to FIGS. 1, 5 and 6, the conveyor 100 optionally includes a transport wheel assembly 160 for selectively raising and lowering wheels 163. Wheels 163-1, 163-2 are optionally disposed on opposing sides of the frame 140. A pivot arm 162 optionally rollingly supports each wheel 163. Each pivot arm 162 is optionally pivotally connected to the frame 140; e.g., at a pivot connection 165 coupled to the frame 140. In the operational configuration of the conveyor 100, the transport wheel assembly 160 is optionally raised and/or retained (e.g., by a pin or other locking device) in a raised position such that the wheels are lifted from the ground and prevented from interfering with radial travel of the conveyor. As may be seen in FIG. 7, in the transport configuration of the conveyor 100 (denoted 100B) the transport wheel assembly 160 is optionally lowered such that the wheels 163 contact the ground. The pivot arms 162 are optionally locked in the lowered transport position such that the wheels 163 bear a portion of the weight of the conveyor 100 during transport.

Figure 9:
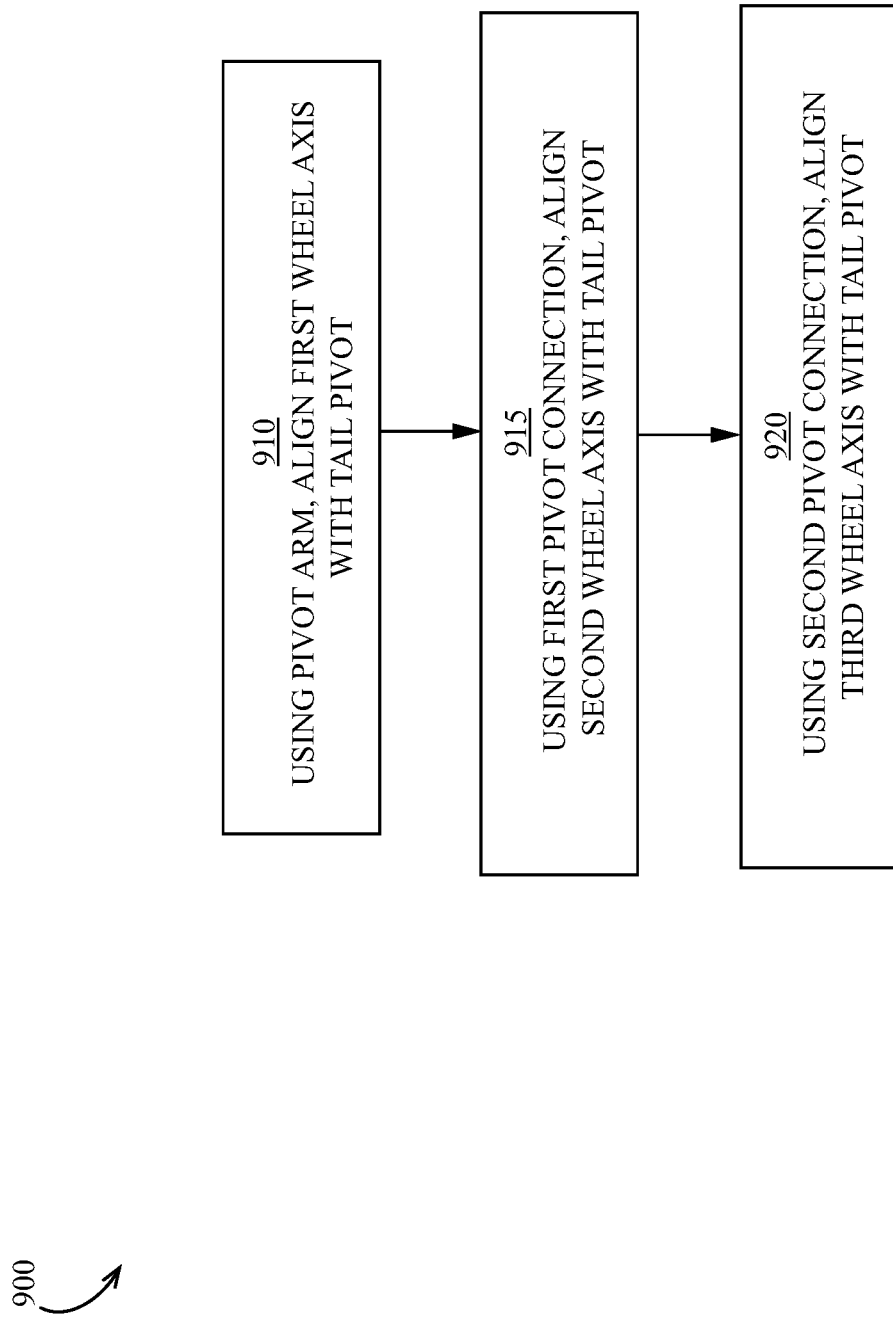
FIG. 9 illustrates a process for reconfiguring a conveyor from a transport configuration to an operational configuration.

Turning to FIG. 9, a process 900 for reconfiguring the wheel support assemblies 300 from a transport configuration to an operating configuration is illustrated. At step 910, a first wheel axis (e.g., the axis Ab) is optionally aligned with the tail pivot 150 of the conveyor. The alignment of the axis Ab may be carried out using the pivot arm 310 and optionally secured using the locking arm 302. At step 915, a second wheel axis (e.g., the axis Aa) is optionally aligned with the tail pivot 150. The alignment of the axis Aa may be carried out using the pivot connection 347 and optionally secured using locking mechanism 390. At step 920, a third wheel axis (e.g., the axis Ac) is optionally aligned with the tail pivot 150. The alignment of the axis Ac may be carried out using the pivot connection 357 and secured using locking mechanism 380.

Figure 10:
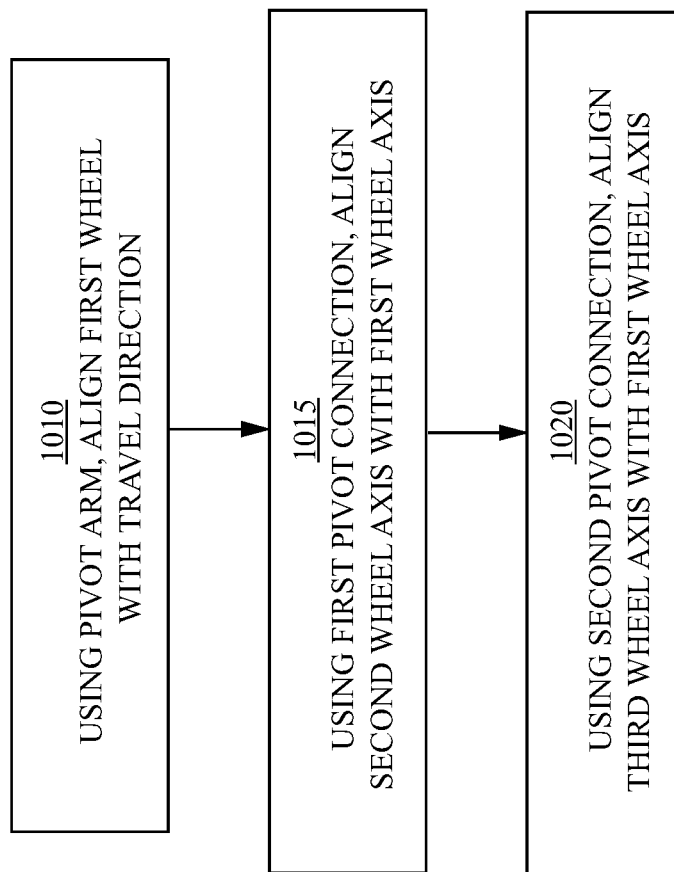
FIG. 10 illustrates a process for reconfiguring a conveyor from an operational configuration to a transport configuration.

Turning to FIG. 10, a process 1000 for reconfiguring the wheel support assemblies 300 from an operating configuration to a transport configuration is illustrated. At step 1010, a first wheel (e.g., one or more wheels 332 of wheel assembly 330b) is optionally aligned with the transport travel direction T of the conveyor. The alignment of the wheels may be carried out using the pivot arm 310 and optionally secured using the locking arm 302. At step 1015, a second wheel axis (e.g., the axis Aa) is optionally aligned with the wheel axis of the first wheel. The alignment of the axis Aa may be carried out using the pivot connection 347 and optionally secured using locking mechanism 390. At step 1020, a third wheel axis (e.g., the axis Ac) is optionally aligned with the wheel axis of the first wheel. The alignment of the axis Ac may be carried out using the pivot connection 357 and secured using locking mechanism 380.

In some embodiments, manual effort may be used to displace of various components described herein as having transport and operational configurations and/or orientations. In alternative embodiments, one or more actuators may be used to actuate the displacement of various components described herein as having transport and operational configurations and/or orientations. In some embodiments, one or more actuators may be disposed to raise and lower the transport wheel assembly 160. In some embodiments, one or more actuators may be disposed to pivot one or more of the pivot arms 310 between the transport and operational configurations. In some embodiments, one or more actuators may be disposed to pivot one or more of the pivoting axle supports between the transport and operational orientations. Additionally, one or more actuators may be disposed to selectively engage and disengage locking mechanisms such as the pins Pb, Pc. In embodiments employing actuators as described herein, the actuator or actuators employed may comprise any suitable actuator (e.g., hydraulic actuator, dual-acting hydraulic actuator, pneumatic actuator, dual-acting pneumatic actuator, motor such as an electric motor, linear actuator such as an electrically powered linear actuator, among others).

Figure 11:
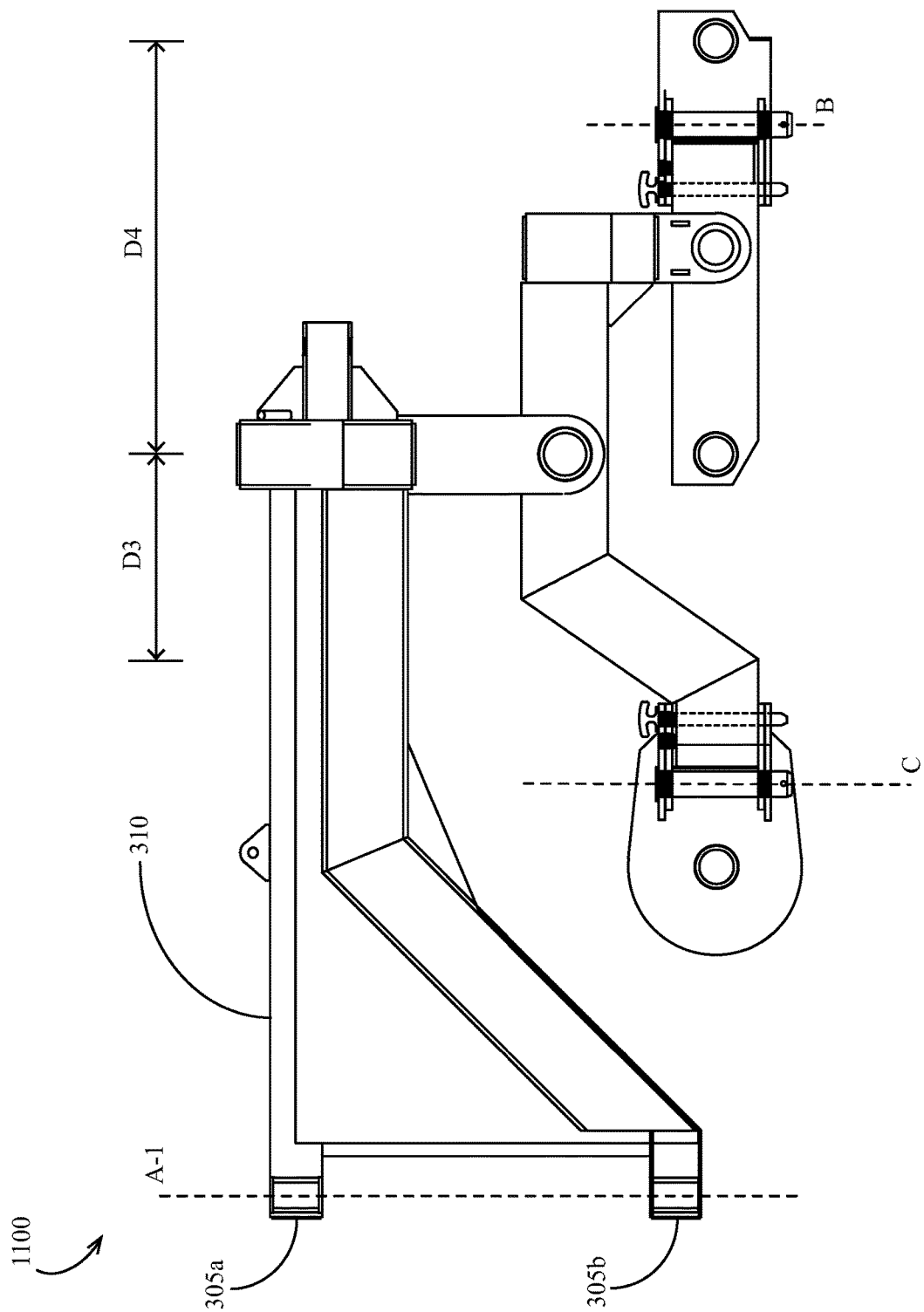
FIG. 11 is a side elevation view of another embodiment of a wheel support assembly.
Figure 12:
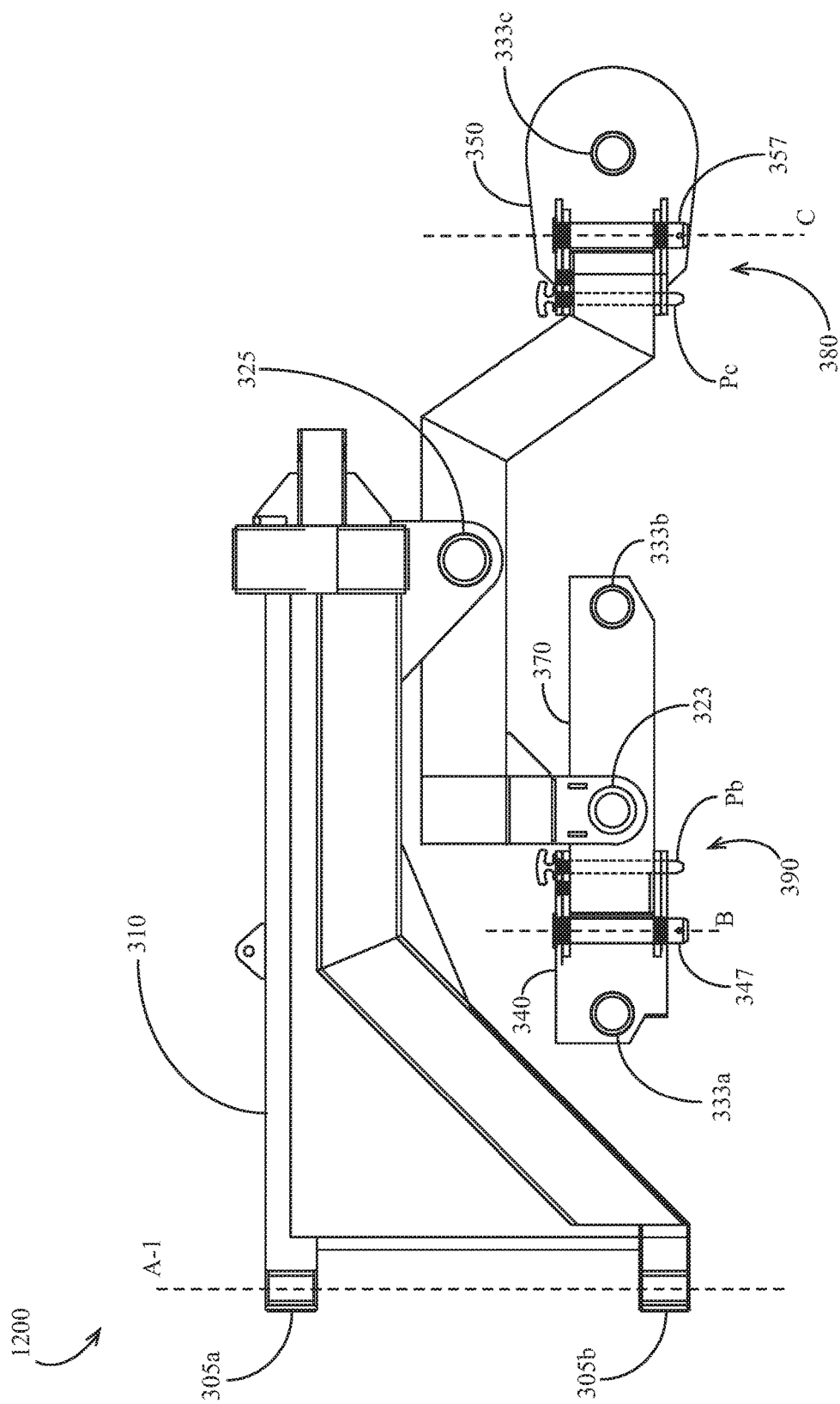
FIG. 12 is a side elevation view of another embodiment of a wheel support assembly.

In some embodiments, the configuration of the wheel support assembly may vary. One alternative embodiment of a wheel support assembly 1100 is illustrated in FIG. 11. The embodiment of FIG. 11 has certain common features with the wheel support assembly 300, but the inboard and outboard positions of axes B and C are reversed. The direction along which the pivoting axle supports are reoriented about axes B and C are also optionally reversed. Another alternative embodiment of a wheel support assembly 1200 is illustrated in FIG. 12. The embodiment of FIG. 12 has certain common features with the wheel support assembly 300. The pivot connection 325 and the axis 333b are optionally not aligned along a vertical plane in the embodiment of FIG. 12.

Figure 13:
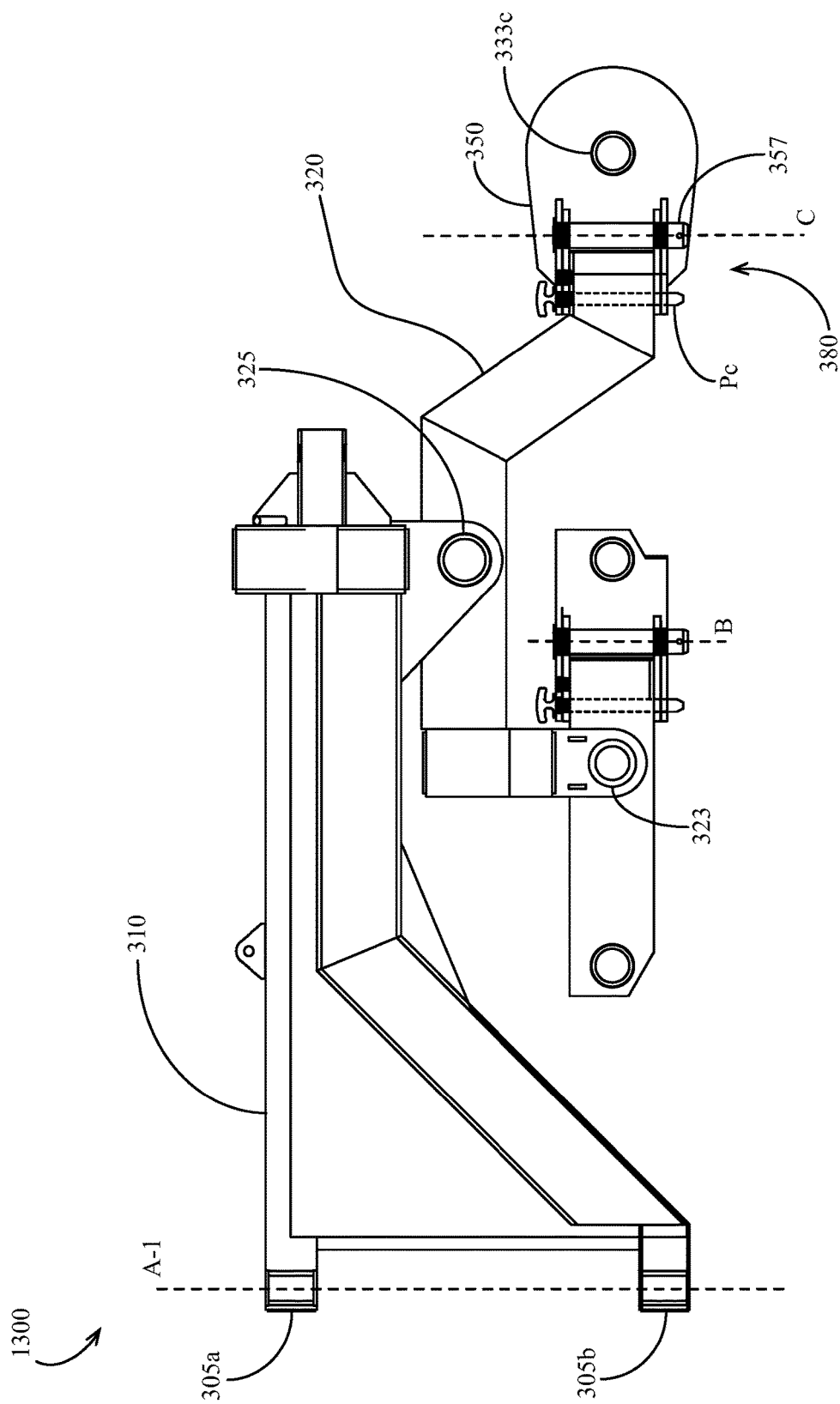
FIG. 13 is a side elevation view of another embodiment of a wheel support assembly.

Another alternative embodiment of a wheel support assembly 1300 is illustrated in FIG. 13. The embodiment of FIG. 13 has certain common features with the wheel support assembly 300, but the inboard and outboard positions of the axis B and the pivot connection 323 are reversed. The direction along which the pivoting axle support is reoriented about axis B is also optionally reversed.

Figure 14:
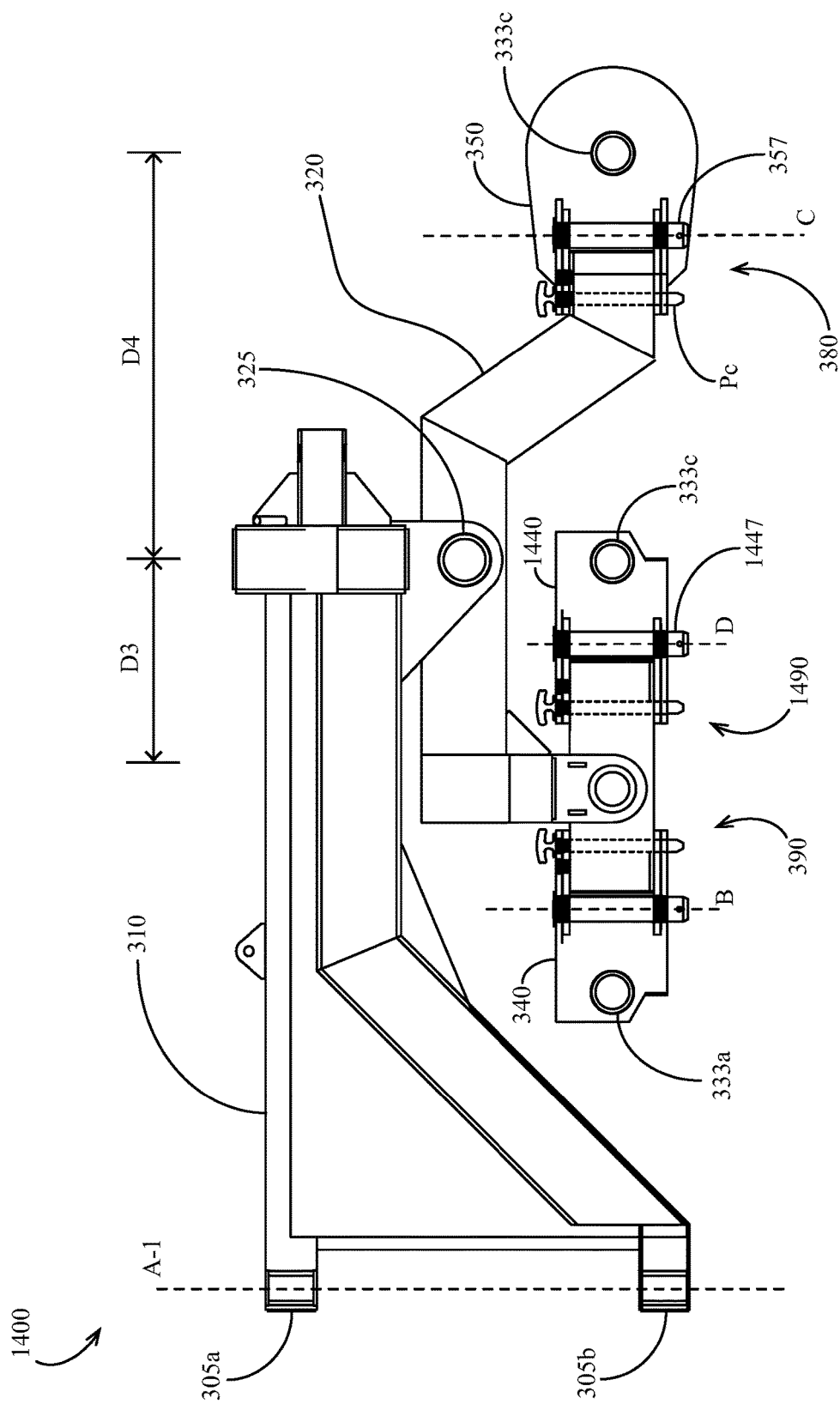
FIG. 14 is a side elevation view of another embodiment of a wheel support assembly.

Another alternative embodiment of a wheel support assembly 1400 is illustrated in FIG. 14. The embodiment of FIG. 14 has certain common features with the wheel support assembly 300. The axle 333c is supported on an additional pivoting axle support 1440 (e.g., disposed on an outboard end of the second rocking member as illustrated). The pivoting axle support 1440 optionally pivots about an axis D (e.g., a vertical axis) which may be defined by a pivotal connection 1447 such as a pin. In the embodiment of FIG. 14, an additional locking mechanism 1490 is optionally configured to selectively lock the pivoting axle support 1440 in a transport orientation (e.g., aligned with the pivoting axle support 340) and an operational orientation (e.g., in which the axle 333c is aligned with the tail pivot 150). It should be appreciated that in the various alternative embodiments described herein, the method of alignment of the various axis with the tail pivot may vary; for example, in the embodiment of FIG. 14, the axle 333c may be aligned with the tail pivot 150 by pivoting about the axis D additionally or alternatively to pivoting of the pivot arm 310.

Figure 15:
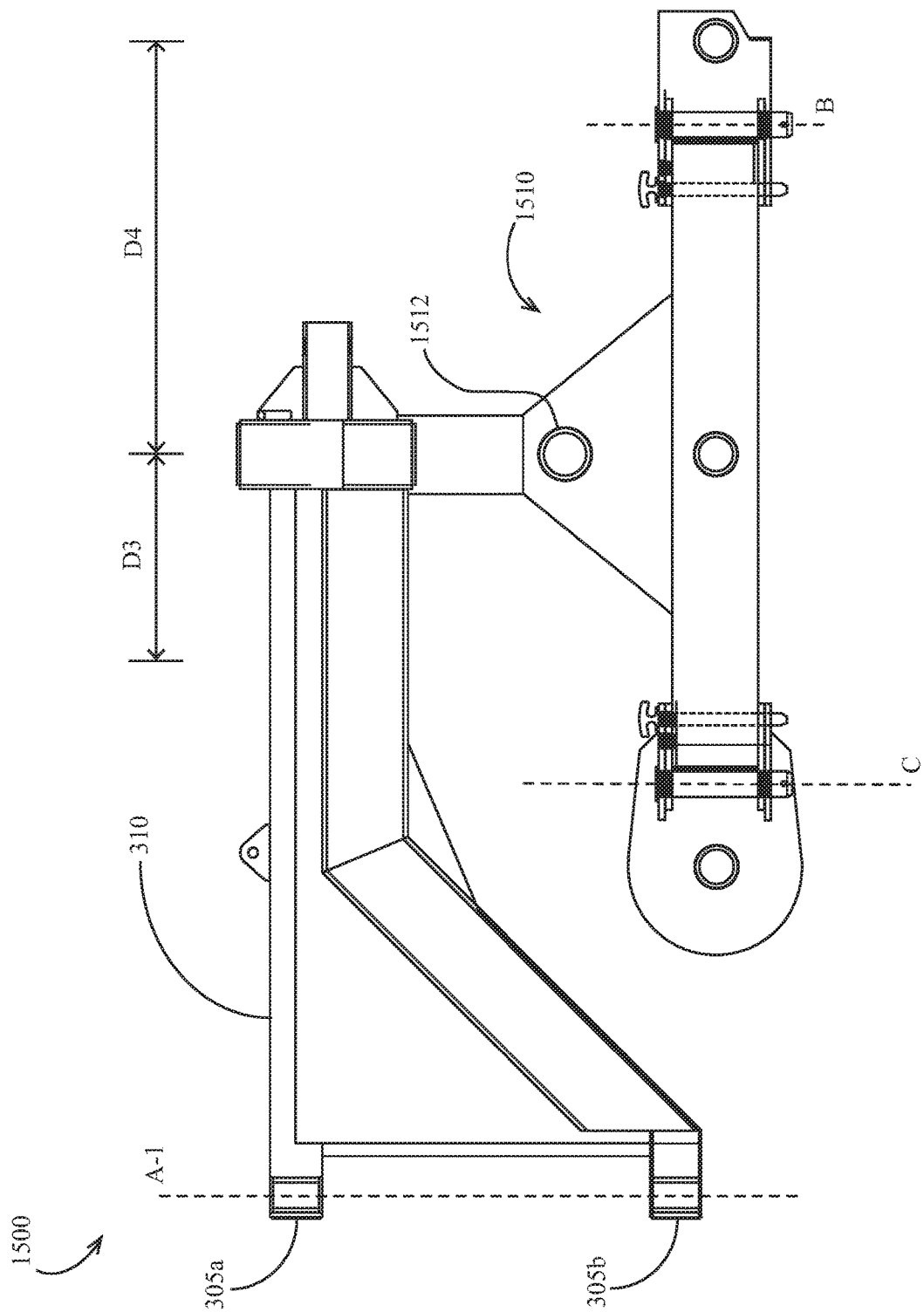
FIG. 15 is a side elevation view of another embodiment of a wheel support assembly.

Another alternative embodiment of a wheel support assembly 1500 is illustrated in FIG. 15. The embodiment of FIG. 14 has certain common features with the wheel support assembly 300. One or more axles 333 (e.g., axles 333a, 333b, 333c) are supported on a pivotal axle support 1510 disposed to pivot about a horizontal axis optionally defined by a pivot 1512.

In various embodiments, the radial conveyors described herein optionally include (e.g., additionally or alternatively) one or more features in common with the radial conveyor embodiments described in U.S. Pat. Nos. 4,427,104; 6,360,876; and 7,470,101; the entire disclosures of which are hereby incorporated by reference herein.

Any ranges recited herein are intended to inclusively recite all values within the range provided in addition to the maximum and minimum range values. Headings used herein are simply for convenience of the reader and are not intended to be understood as limiting or used for any other purpose.

Although various embodiments have been described above, the details and features of the disclosed embodiments are not intended to be limiting, as many variations and modifications will be readily apparent to those of skill in the art. Accordingly, the scope of the present disclosure is intended to be interpreted broadly and to include all variations and modifications within the scope and spirit of the appended claims and their equivalents. For example, any feature described for one embodiment may be used in any other embodiment.

The invention claimed is:

1. A radial conveyor having a transport configuration and an operating configuration, the radial conveyor configured to pivot about a tail pivot axis along a radial travel path in the operating configuration, the radial conveyor configured to travel along a transport travel direction in the transport configuration, the radial conveyor comprising:
   an undercarriage frame;
   a first pivot arm, the first pivot arm being pivotally coupled to a first side of said undercarriage frame for pivoting about a first vertical axis;
   a first wheel support assembly operably supported by said first pivot arm, the wheel support assembly comprising:
      a first rocking member, said first rocking member being pivotally coupled to said pivot arm for pivoting about a first horizontal axis;
      a second rocking member, said second rocking member being pivotally coupled to said first rocking member for pivoting about a second horizontal axis;
      a first axle support, said first axle support being pivotally coupled to said second rocking member for pivoting about a second vertical axis;
      a first wheel rollingly supported on said first axle support;
      a second wheel rollingly supported on said second rocking member;
      a second axle support, said second axle support being pivotally coupled to said first rocking member for pivoting about a third vertical axis; and
      a third wheel rollingly supported on said second axle support.

2. The radial conveyor of claim 1, wherein said first axle support is pivotable between a first and second position of the first axle support, wherein said second axle support is pivotable between a first and second position of the second axle support, wherein said first and second axle supports are in their respective first positions in the transport configuration, and wherein said first and second axle supports are in their respective second positions in the operating configuration.

3. The radial conveyor of claim 2, wherein in said operating configuration, an axis of rotation of said first wheel is aligned with said tail pivot axis, and wherein in said operating configuration, an axis of rotation of said second wheel is aligned with said tail pivot axis.

4. The radial conveyor of claim 3, wherein in said transport configuration, an axis of rotation of said first wheel is generally perpendicular to the transport direction, and wherein in said transport configuration, an axis of rotation of said second wheel is generally perpendicular to said transport direction.

5. The radial conveyor of claim 3, further comprising:
   a first locking mechanism configured to alternately lock the first axle support in said first and second positions of the first axle support; and
   a second locking mechanism configured to alternately lock the second axle support in said first and second positions of the first axle support.

6. The radial conveyor of claim 2, further comprising:
a first locking mechanism configured to alternately lock the first axle support in said first and second positions of the first axle support; and
a second locking mechanism configured to alternately lock the second axle support in said first and second positions of the first axle support.

7. The radial conveyor of claim 1, wherein said first horizontal axis is disposed outboard of said second horizontal axis.

8. The radial conveyor of claim 1, wherein said third vertical axis is disposed outboard of said second vertical axis.

9. The radial conveyor of claim 1, wherein said first pivot arm extends generally outwardly from said undercarriage frame in the operating configuration, and wherein said pivot arm is generally aligned with said transport travel direction in the transport configuration.

10. The radial conveyor of claim 1, further comprising:
a second pivot arm, the second pivot arm being pivotally coupled to a second side of said undercarriage frame; and
a second wheel support assembly operably supported by said second pivot arm.

11. A method of reconfiguring a radial conveyor having first, second, and third wheels supported on a pivot arm between a transport configuration in which the radial conveyor is transported along a linear transport travel direction and an operating configuration in which the radial conveyor travels along a radial travel direction about a tail pivot, the method comprising:
using the pivot arm, aligning an axis of the second wheel with the tail pivot;
aligning an axis of the first wheel with the tail pivot;
aligning an axis of the third wheel with the tail pivot;
using a locking arm, locking the pivot arm in position such that the axis of the second wheel is aligned with the tail pivot;
using a first locking mechanism, locking the first wheel in alignment with the tail pivot and
using a second locking mechanism, locking the third wheel in alignment with the tail pivot.

12. The method of claim 11, further comprising:
using the first pivot arm, aligning the second wheel with the transport travel direction;
aligning an axis of the second wheel with the axis of the first wheel; and
aligning an axis of the third wheel with the axis of the first wheel.

13. A radial conveyor having a transport configuration and an operating configuration, the radial conveyor configured to pivot about a tail pivot axis along a radial travel path in the operating configuration, the radial conveyor configured to travel along a transport travel direction in the transport configuration, the radial conveyor comprising:
an undercarriage frame;
a first pivot arm, the first pivot arm being pivotally coupled to a first side of said undercarriage frame for pivoting about a first vertical axis;
a first wheel support assembly operably supported by said first pivot arm, the wheel support assembly comprising:
a first rocking member, said first rocking member being pivotally coupled to said first pivot arm for pivoting about a first horizontal axis;
a first axle support, said first axle support operably supported by said first rocking member, said first axle support being pivotable about a second vertical axis;
a first wheel rollingly supported on said first axle support;
a second wheel operably supported by said first rocking member;
a second axle support, said second axle support being pivotally coupled to said first rocking member for pivoting about a third vertical axis; and
a third wheel rollingly supported on said second axle support.

14. The radial conveyor of claim 13, wherein said first axle support is pivotable between a first and second position of the first axle support, wherein said second axle support is pivotable between a first and second position of the second axle support, wherein said first and second axle supports are in their respective first positions in the transport configuration, and wherein said first and second axle supports are in their respective second positions in the operating configuration.

15. The radial conveyor of claim 14, wherein in said operating configuration, an axis of rotation of said first wheel is aligned with said tail pivot axis, and wherein in said operating configuration, an axis of rotation of said second wheel is aligned with said tail pivot axis.

16. The radial conveyor of claim 15, wherein in said transport configuration, an axis of rotation of said first wheel is generally perpendicular to the transport direction, and wherein in said transport configuration, an axis of rotation of said second wheel is generally perpendicular to said transport direction.

17. The radial conveyor of claim 13, further comprising:
a second rocking member pivotally coupled to said first rocking member for pivoting about a second horizontal axis, wherein said first axle support is pivotally coupled to said second rocking member.

18. The radial conveyor of claim 13, wherein said second wheel is rollingly mounted to said second rocking member.

19. The radial conveyor of claim 18, wherein an axis of said second wheel is vertically aligned with said first horizontal axis.

* * * * *